(12) United States Patent
Grams et al.

(10) Patent No.: US 6,371,717 B1
(45) Date of Patent: Apr. 16, 2002

(54) DEVICE FOR MECHANICALLY GRIPPING AND LOADING CYLINDRICAL OBJECTS

(75) Inventors: Robert S. Grams; Scott K. Haddix, both of Waukesha, WI (US)

(73) Assignee: ABB Automation Inc., New Berlin, WI (US)

( * ) Notice: Subject to any disclaimer, the term of this patent is extended or adjusted under 35 U.S.C. 154(b) by 0 days.

(21) Appl. No.: 09/568,749

(22) Filed: May 11, 2000

(51) Int. Cl.[7] .................. B65B 21/02; B65B 69/00; B65G 65/04; B65G 65/34; B66C 1/42
(52) U.S. Cl. .............. 414/416.09; 414/736; 294/81.61; 294/87.1
(58) Field of Search ............... 414/416.09, 736; 294/81.61, 87.1

(56) References Cited

U.S. PATENT DOCUMENTS

| | | | |
|---|---|---|---|
| 1,974,255 A | | 9/1934 | Behrendt |
| 2,308,209 A | * | 1/1943 | Schmutzer et al. ..... 294/87.1 X |
| 2,398,747 A | | 4/1946 | Keith et al. |
| 2,863,579 A | | 12/1958 | Meyer |
| 2,918,325 A | | 12/1959 | Gibson |
| 3,125,369 A | | 3/1964 | Copping |
| 3,166,207 A | | 1/1965 | Quayle |
| 3,670,912 A | | 6/1972 | Dunbar |
| 3,713,554 A | | 1/1973 | Thompson et al. |
| 3,724,686 A | | 4/1973 | Nelson |
| 3,777,913 A | | 12/1973 | Schieser et al. |
| 3,780,492 A | * | 12/1973 | Corderoy ................ 294/87.1 X |
| 3,856,343 A | * | 12/1974 | Muller ................... 294/87.1 X |
| 3,885,825 A | | 5/1975 | Amberg et al. |
| 3,984,009 A | | 10/1976 | Holroyd |
| 4,351,553 A | | 9/1982 | Rovetta et al. |
| 4,390,313 A | | 6/1983 | Hoehm |
| 4,444,423 A | * | 4/1984 | Montferme et al. ... 294/87.1 X |
| 4,444,424 A | * | 4/1984 | Lebret .................... 294/87.1 X |
| 4,482,289 A | * | 11/1984 | Inaba et al. ............. 414/736 X |
| 4,486,045 A | * | 12/1984 | Trygg .................... 294/87.1 X |
| 5,005,889 A | | 4/1991 | Nerger et al. |
| 5,018,776 A | * | 5/1991 | Trygg .................... 294/87.1 X |
| 5,082,413 A | | 1/1992 | Grosz et al. |
| 5,326,218 A | | 7/1994 | Fallas |
| 5,403,056 A | | 4/1995 | Wallace |
| 5,487,257 A | * | 1/1996 | Domeier et al. .... 414/416.09 X |
| 5,507,849 A | * | 4/1996 | Wenz .................... 294/87.1 X |
| 5,511,933 A | | 4/1996 | Herklotz |
| 5,539,981 A | | 7/1996 | Burcham et al. |
| 5,587,000 A | * | 12/1996 | Mann et al. ............ 414/731 X |

FOREIGN PATENT DOCUMENTS

| | | |
|---|---|---|
| BE | 656035 | 3/1965 |
| NL | 8304042 | 6/1985 |
| SU | 157075 | 12/1963 |

* cited by examiner

*Primary Examiner*—Christopher P. Ellis
*Assistant Examiner*—Gene O. Crawford
(74) *Attorney, Agent, or Firm*—Ryan Kromholz & Manion, S.C.

(57) ABSTRACT

A device for mechanically gripping, transporting, loading and unloading cylindrical containers of various sizes for attachment to a robotic arm. The containers may be bottles including drinking water bottles. The device includes a plurality of gripping mechanisms for gripping the containers. Support pins are also provided for supporting the rotational motion of full bottles. A system for efficiently removing empty containers from racks and simultaneously loading full containers is also disclosed.

15 Claims, 8 Drawing Sheets

DEVICE FOR MECHANICALLY GRIPPING AND LOADING CYLINDRICAL OBJECTS

BACKGROUND OF THE INVENTION

The present invention relates generally to the field of gripping, transporting, loading and unloading objects such as cylindrical containers for fluids, and specifically to a device that is capable of loading and unloading empty, partially filled, or completely filled, water bottles. Water bottles come in a variety of sizes. Those commonly used for drinking water include three (3), four (4) and five (5) gallon bottles. However, it is to be understood that the present invention could be used with any size container or bottle. Large water bottles, and especially those that are filled or partially filled, are difficult to pick up, hold and transport, due to their unique cylindrical shape and weight. Often, there is typically a requirement of not marring the exterior surface of each bottle during loading and unloading. Moreover, drinking water bottles are often recycled and refilled. Filled bottles are loaded into racks for storage and transport to customers. The same racks are returned to the water processing facility with empty bottles. The empty bottles must be removed from each rack before filled bottles are reloaded.

At the end of a water processing conveyor line, water bottles often arrive filled with specially filtered or processed water. While each cylindrical, bottle-shaped, container serves the primary purpose of confining the water or other fluid during shipping, the container may also serve the function of identifying the product through the use of trademarks or other product information applied directly on the container. On more elaborately printed water bottles, there may appear indicia advertising the product or its benefits. Three, four, and five gallon water bottles are commonly placed on top of a water cooler or water-dispensing device. These devices are often found in offices, homes and other highly visible areas. Therefore the container must be aesthetically attractive and visually appealing. Accordingly, it is of utmost importance that each container, and especially its product indicia, not be damaged or scuffed during removal from the conveyor line and loading for shipment. It is also important that the empty bottles returned for re-filling be treated with similar care.

In most instances the tasks of removing empty containers from the racks and loading full containers from a conveyor into the racks for storage or shipping have been carried out manually. While having some advantages, such as insuring that the containers are not damaged, manually handling containers is relatively a strenuous and tedious task. The continued lifting and moving of multiple, heavy filled containers can cause workers to strain and injure their backs. Further, depending upon the output speed and configuration of the conveyor line, many workers may be required to remove and properly load the filled containers. In an effort to reduce workforce size and injury costs, there has been a significant move toward automating this process by utilizing robots.

As is known in the art, industrial robots may be fitted with various grasping devices, known as "end-effectors" or "end of arm tools" (EOATs). Such devices may be utilized for the automated gripping and transporting of objects, including containers.

Most drinking water containers are cylindrical in shape and include a top, a neck, a cylindrical sidewall, and a bottom. Near the end of the water processing conveyor line, a cap is placed over the top and partially around the neck to seal the fluid within the container. Provided that the cap has been properly sealed to the container, the water will not leak, even if the container is partially or fully inverted.

Many end-effectors are commercially available for grasping various containers from a conveyor line and transporting them to another area. For example, a container may be removed from a conveyor line by one or more suction cups that temporarily adhere to the container. Alternatively, a pair of mechanical arms may apply a predetermined amount of pressure to the sidewalls of the container such that the container may be lifted and transported. It is even conceivable that a bladder could be placed around the container and then inflated to grasp the container for transport.

However, if a water bottle to be transported from a conveyor line to another station is relatively heavy (i.e. filled with a fluid, such as water), its unique geometrical shape combined with its weight makes it difficult to grasp. Suction cups cannot be readily attached to a heavy container having a unique geometry including cylindrical outer walls. Similarly, a number of mechanical arms applying a sufficient amount of pressure against the sidewall of the cylindrical container would most likely collapse or crush the container before the exerted force was great enough to lift and transport the filled container. Inflating and deflating a bladder is too time consuming and would not keep up with the rate at which filled containers arrive at the conveyor line end.

Another factor that controls the choice of device employed for removing bottle-shaped containers from a conveyor line and transferring them to a storage rack (or vice versa) is the consistency of container size. If each container coming off the conveyor line has the same physical size, the robotic end-effector can be designed specifically for that specific container size. However, if the container size varies, the end-effector must be capable of being readily adjustable to accommodate various container sizes.

Another factor that often dictates the means utilized for removing containers from conveyor lines and transporting them to storage racks is the amount of space available at the end of the conveyor line for this operation. Often times there is very little space allocated at the end of the conveyor line for removing containers. If a robot and robotic end-effector are to be utilized, the system must be sufficiently compact to allow for installation and operation within the allotted space available for such a device.

When filled water bottles are transported on a conveyor, they are typically moved in their upright position. The bottom or base of the bottle rests on the conveyor belt and the neck and bottle opening extend upwardly. However, the racks that are utilized for storage and transportation of water bottles hold the bottles in a horizontal orientation. Accordingly, the present invention must be capable of gripping each fall bottle and rotating the bottle from a generally vertical position to a generally horizontal position before inserting the bottle into the rack.

Accordingly, there is a need for a device that may be used for the gripping, transportation and placement of heavy and light cylindrical containers between two stations such as a conveyor line and a storage rack in an efficient manner. There is also a need for a device capable of easily gripping and rotating the cylindrical containers without damage. More specifically, there is a need for a device that is compact enough to be positionable and operationable at the end of a conveyor line. Furthermore, the device must be able to appropriately rotate the containers from their upright position to a horizontal position between the conveyor line and storage racks.

SUMMARY OF THE INVENTION

According to the present invention, the foregoing and other objects and advantages are attained by providing an apparatus which may be used in a confined environment to efficiently grasp and transport cylindrical objects of various sizes and weights between a pick-up position, such as the end of a conveyor line and a storage rack. The apparatus may also be used to grasp cylindrical objects from a storage rack and transport each object onto a pallet, into a case, or onto another conveyor line. In addition to grasping each object, the apparatus is capable of supportably rotating some objects through three hundred sixty (360) degrees of rotation and others through ninety (90) degrees of rotation in various planes.

A further object of the present invention is to provide an end-effector for an industrial robot, the end-effector being capable of picking up one or more cylindrical containers from a pick-up position and transporting the containers to a rack for storage or shipping. At the same time, additional cylindrical containers may be removed from the same rack and transported to the original pick-up position or another position.

A further object of the invention is to provide an end-effector that is capable of securely grasping each cylindrical object or container, whether empty or full, while not damaging or marring its outer surface.

In accordance with another aspect of the invention, the device can be utilized in a relatively confined area, as it requires a minimum amount of space around the periphery of the cylindrical container for gripping and loading or unloading the container.

A further advantage of the invention is to provide an end-effector for use with a robot that is easily adjustable to grip cylindrical containers of various sizes.

A further advantage of the invention is to provide a robotic end-effector that is capable of gripping more than one cylindrical container from a pick up position and transporting a group of containers to a separate location. The invention is similarly capable of gripping more than one cylindrical container from a rack and transporting said group to another location.

These and other objects and advantages are achieved in a system designed to unload empty and load filled, three, four, and five gallon water bottles into rack assemblies. Empty rack assemblies are loaded into a rack conveyor by a loading mechanism, such as a fork lift truck. The racks are next positively located for robotic loading.

Filled water bottles are conveyed into the robotic cell on the infeed conveyor. To avoid excessive backpressure, a stop mechanism allows only a predetermined number of bottles to enter the robotic pickup location. A product locator is advanced, around and between each bottle, creating the proper spacing to coincide with the rack being loaded. The robotic gripper assembly has also been adjusted to have the same spacing between the gripper mechanisms. When the bottles have been metered into position, and properly located, a conventional programmable logic controller (PLC) or similar device connected to the conveyor system signals the robot controller or control system for the robot that the bottles are ready for pickup.

Racks of empty bottles are conveyed into the robotic cell on the rack infeed conveyor. A rack is conveyed into the loading position, and positively positioned and held for robotic loading. When the rack has been positioned, the PLC signals the robot control system that a rack is ready for unloading and loading. The robot proceeds to unload empty bottles from the rack, and simultaneously, load full bottles into the rack.

The end-effector handles the same number of full bottles and empty bottles per robot cycle. Each gripper mechanism on the end-effector includes a plurality of fingers capable of moving between an open and a closed position around the bottleneck. The gripper mechanisms engage and grip around each bottleneck. In conjunction with each gripper mechanism, a pair of support pins is provided. The support pins run parallel with the longitudinal axis of each gripper mechanism. As the robot lifts the filled bottles from the conveyor, the robot wrist or fifth axis tilts upward, rotating the bottom of the bottle upwards. The support pins carry the weight of the filled bottle.

In a preferred embodiment, the invention may be described as an apparatus for gripping, transporting and loading or unloading a container capable of holding fluid, the apparatus having a pair of parallel rails spaced a predetermined distance from one another; a plurality of gripper mechanisms, each gripper mechanism being affixed to one of the rails; each gripper mechanism having a plurality of fingers, said finger having distal ends and each said finger being capable of moving from an open position to a clamped position; and each finger having a clamp plate attached to its distal end. In addition, the apparatus may include a number of support pins attached to each rail for supporting the containers, In another preferred embodiment, the present invention is a robotic end-effector for an industrial robot, said robotic end-effector having a plate capable of being coupled to the robot, the plate including a pair of rails spaced laterally on said plate; a plurality of gripper mechanisms attached to each rail; each gripper mechanism having a number of fingers, said fingers capable of moving from an open position to a closed position.

In addition, the invention may be described as a system for gripping, transferring and loading or unloading fluid containers from a pick up position, the system comprising a supply of full containers at the pick up position; a rack, the rack filled with empty containers, a robot with an end-effector, the end-effector having a plurality of gripper mechanisms attached thereto; and an unloading station adjacent said pick up position whereby said end-effector simultaneously removes empty containers from said rack and loads full containers into said rack.

The present invention may also be described as a method for unloading empty containers and loading full containers into a rack, the method including the steps of removing an empty container from a group of empty containers in the rack, transferring said empty container to a drop off station, substantially simultaneously releasing said empty container while gripping a full container from a pick up station, transferring said full container to said rack, and loading said full container in said rack.

DETAILED DESCRIPTION

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

Figure 1:
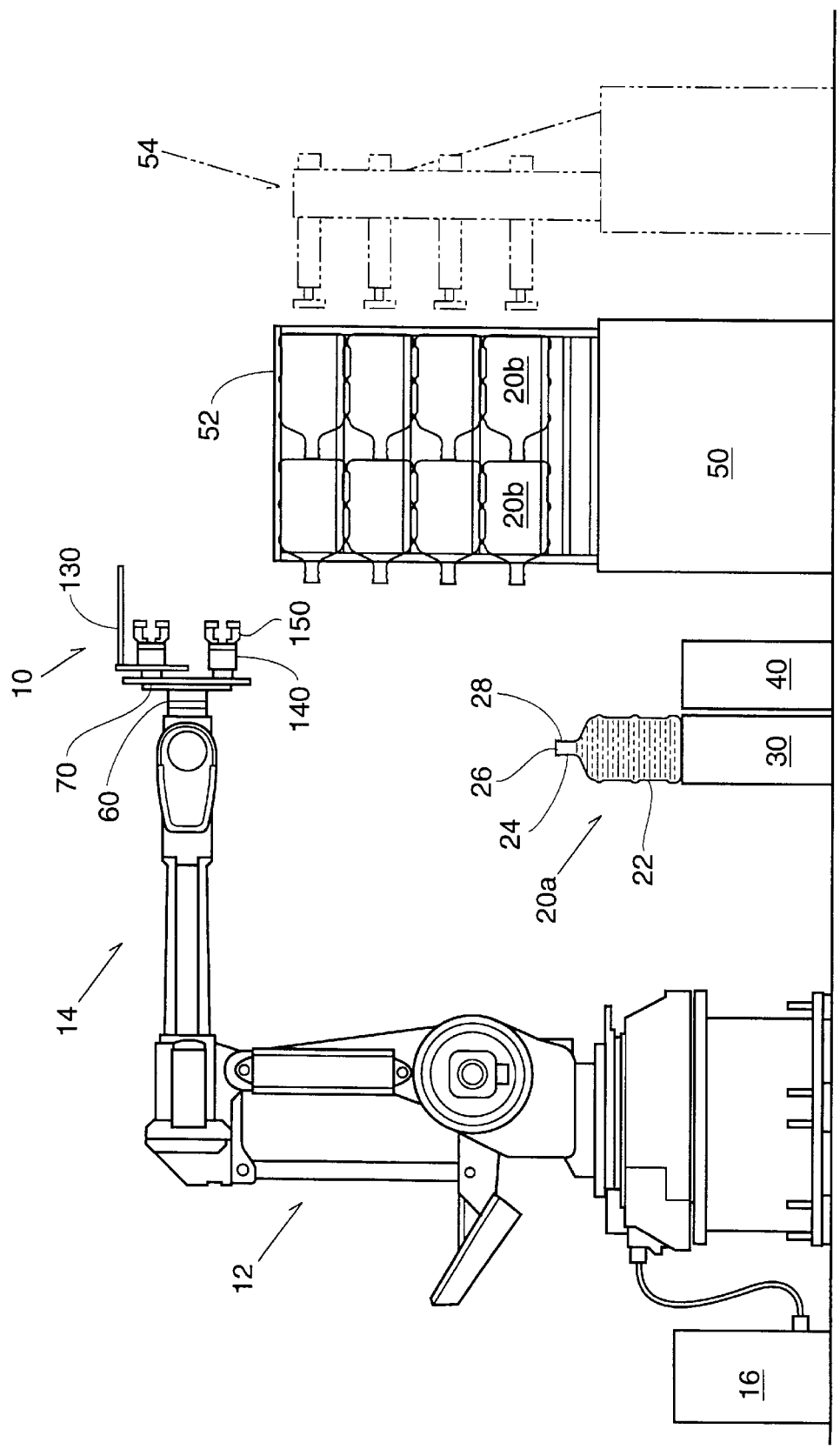
FIG. 1 is an environmental view depicting an industrial robot and arm, the end-effector of the present invention, an empty bottle conveyor, a full bottle conveyor, a rack and a rack conveyor.
Figure 2:
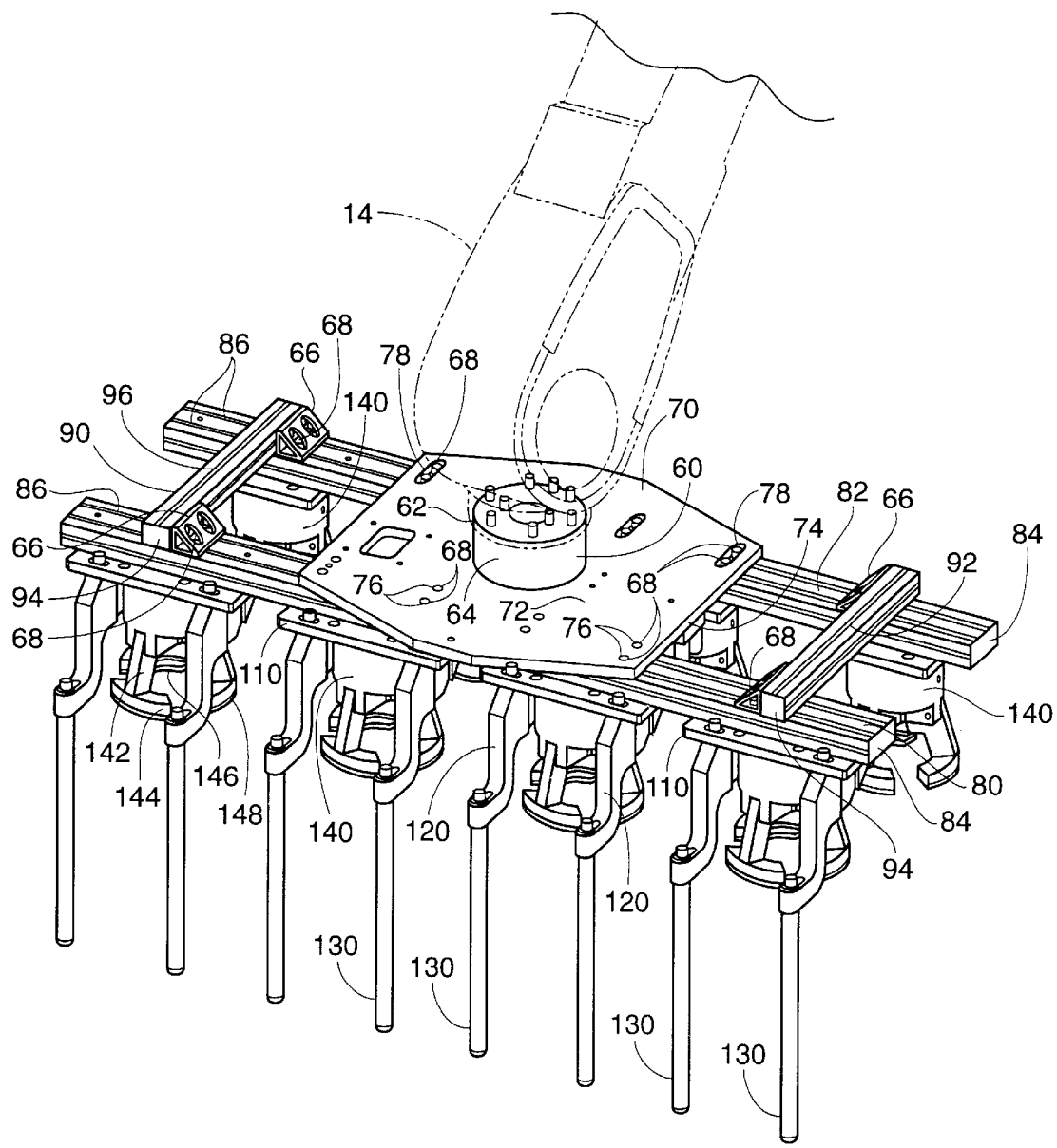
FIG. 2 is a perspective view of the end-effector.

With reference to FIGS. 1 and 2, it will be observed that the present invention comprises an improved end-effector apparatus 10, mounted on the arm 14 of a conventional multiple axis industrial robot 12 for gripping, transporting, loading and unloading cylindrical containers or water bottles 20. In brief, the apparatus 10 includes a stanchion or wrist spacer 60, a supporting top plate 70, a plurality of bottle support pins 130 and a plurality of gripper mechanisms 140. Each gripper mechanism 140 has a plurality of fingers 150 for gripping the bottleneck 24 of each bottle 20.

With particular reference to FIG. 1, the operational environment of the present invention is shown with the end-effector apparatus 10 for gripping, transporting, loading and unloading containers 20 and the industrial robot 12 to which it is attached. Robot 12 is a 6-position or 6-axis industrial robot and includes a robot control system 16. Adjacent the robot 12 and the apparatus 10 are a pair of conveyors 30 and 40. Conveyor 30 is an infeed conveyor that delivers full water bottles 20a to the robotic cell. Conveyor 40 is an exit conveyor that transports empty containers 20b from the cell. Also present is a rack conveyor 50. Rack conveyor 50 brings racks 52 of empty bottles 20b into the cell and conveys racks of filled bottles 20a from the cell for subsequent shipping or storage. The empty bottles 20b are removed from the racks 52 and full bottles 20a are loaded into the racks 52 in a predetermined order to minimize the number of robot 12 movements, thus maximizing system efficiency. A filled container or water bottle 20a, having a cylindrical side wall 22, neck 24 and top 26 is shown on infeed conveyor 40 ready to be transported to the rack 52. Filled containers 20a include a bottle cap 28 placed over and sealing the top 26. If the rack is of the two-bottle deep design (as shown in FIG. 1), a known bottle pushing apparatus 54, such as the one shown in phantom, may be utilized to bias the rearward bottles to the front of the rack after the forward bottles have been removed.

While not shown in the figures, it is to be understood that the sizes of the containers 20 may be different. For example, drinking water is commonly contained within five (5), four (4), and three (3) gallon bottles. Further, the racks 52 into which the bottles 20 are removed and loaded can be of various sizes without departing from the present invention. In the purified water industry, common rack sizes include, but are not limited to three bottles by four bottles, three bottles by five bottles, four bottles by four bottles, and four bottles by five bottles. As mentioned above with respect to pushing device 54, it is also common for the bottles to be positioned two bottles deep within each rack. As will be discussed in detail below, the ability to grip and unload or load containers of various sizes out of and into racks of various configurations is a benefit of the present invention 10.

The present invention is shown in greater detail in the view of FIG. 2. The robotic arm 14 is shown in phantom. Connected to the arm 14 is a stanchion or wrist spacer 60 at its proximate end 62. The distal end 64 of the wrist spacer 60 is connected to a supporting top plate 70. While both the proximate and distal end wrist spacer connections are shown to be achieved by utilizing a plurality of pins and fasteners, it is to be understood that any conventional way of connecting the industrial robot arm 14 to the top plate 70 could be utilized.

Supporting top plate 70 has an outer surface 72 and an inner surface 74. Referring now to FIG. 2, mounted to the inner surface 74 of top plate 70 is a pair of first support rails 80 and 82. Rail 80 is a fixed rail with respect to top plate 70. It will be appreciated that rail 80 is fastened in a conventional manner to top plate 70 with fasteners 68 in two locations through pairs of circular openings 76 formed in the top plate. By contrast, rail 82 is a movable or adjustable rail. Again referring to FIG. 2, it will be seen that rail 82 is attached to top plate 70 through elongate openings 78 formed in top plate 70. Accordingly, the position of movable rail 82 relative to fixed rail 80 can be easily adjusted by loosening the fasteners 68 that pass through the elongate openings 78 and then re-tightening the fasteners 68 in the desired position. The support rails 80 and 82 are preferably fabricated from aluminum, although any suitable material could be used. One or more end caps 84 may be installed on the rail ends.

For added structural integrity, a second pair of support rail members 90 and 92 is affixed with brackets 66 and fasteners 68 to first rail members 80 and 82 near their distal ends. Rail members 90 and 92 are attached to slots 86 formed in rail members 80 and 82. Similar slots 96 in rail members 90 and 92 allow for the above-described adjustment of rail members 80 and 82. Again, rails members 90 and 92 are preferably fabricated from aluminum and may include end caps 94 on their ends.

Figure 4:
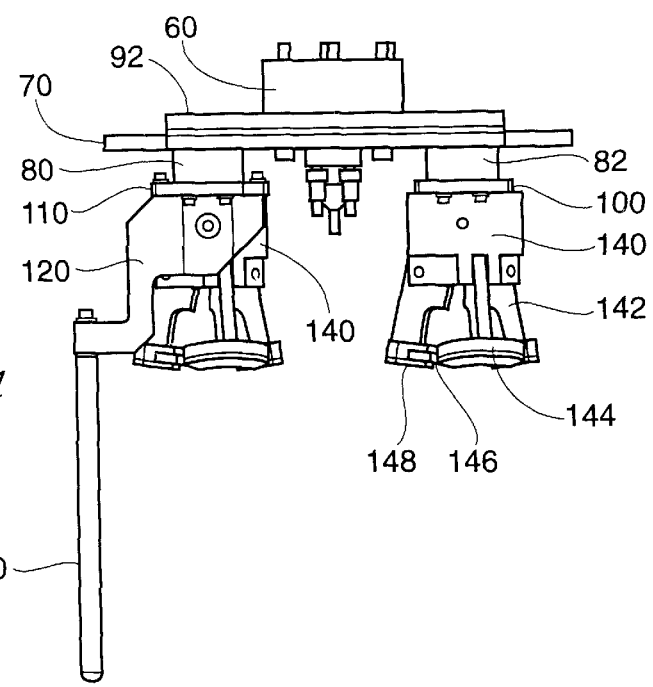
FIG. 4 is a side elevational view of the end-effector.

As best shown in FIG. 4, a plurality of full bottle gripper plates 110 is attached to fixed rail 80. Similarly, a number of empty bottle gripper plates 100 is attached to adjustable support rail 82. Each plate is attached using fasteners that pass through openings in the plate and into the elongate channels formed in each support rail 80 and 82. Typically, the location of one empty bottle gripper plate 100, attached to adjustable support rail 82, is permanently fixed and the location of one full bottle gripper plate 110, attached to fixed rail 80, is also permanently fixed. The remaining gripper plates 100 and 110 are movable along the length of the elongate channel 86 to provide the required spacing for containers 20 of different sizes or storage rack centers.

Figure 3:
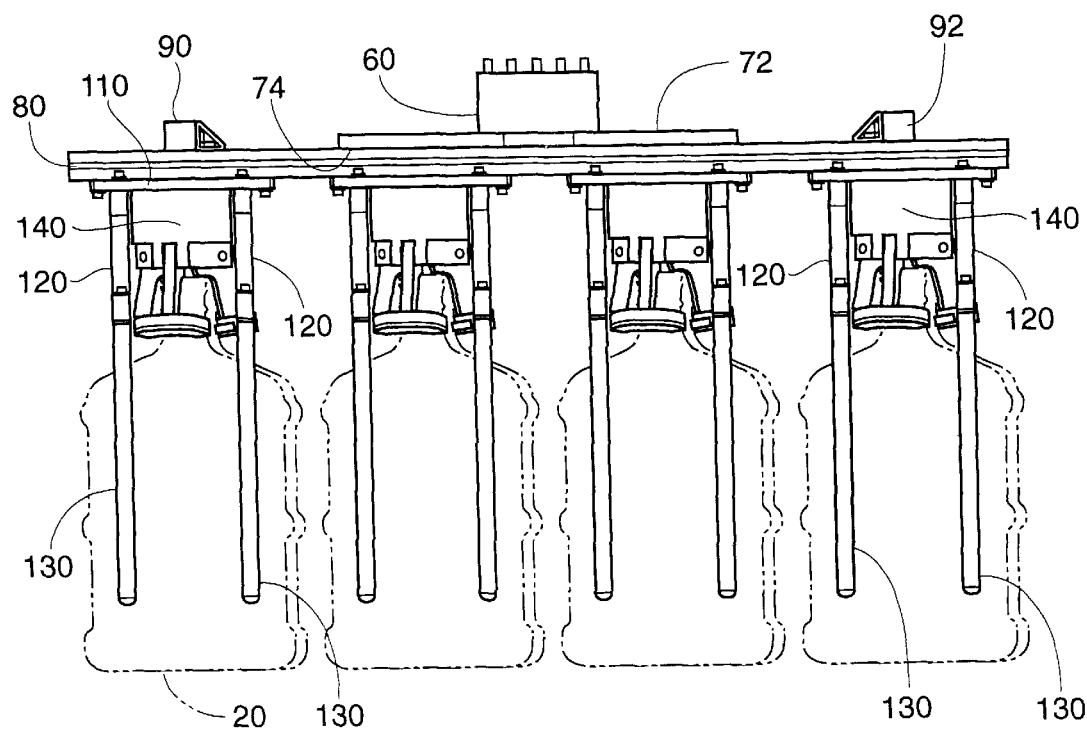
FIG. 3 is a front elevational view of the end-effector.
Figure 5A:
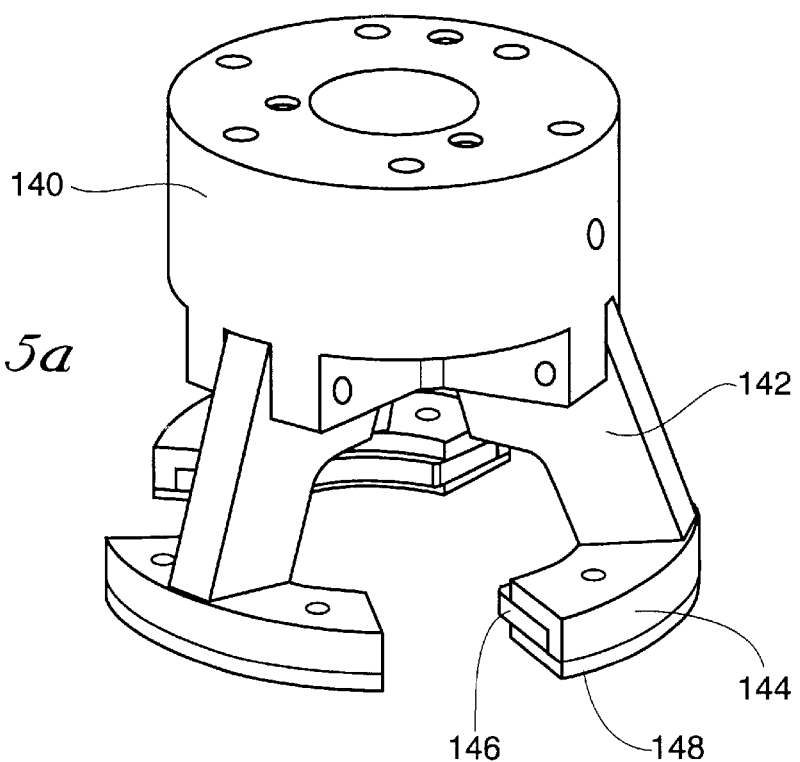
FIG. 5a is a perspective view of a gripper mechanism, showing the fingers in their open position.
Figure 5B:
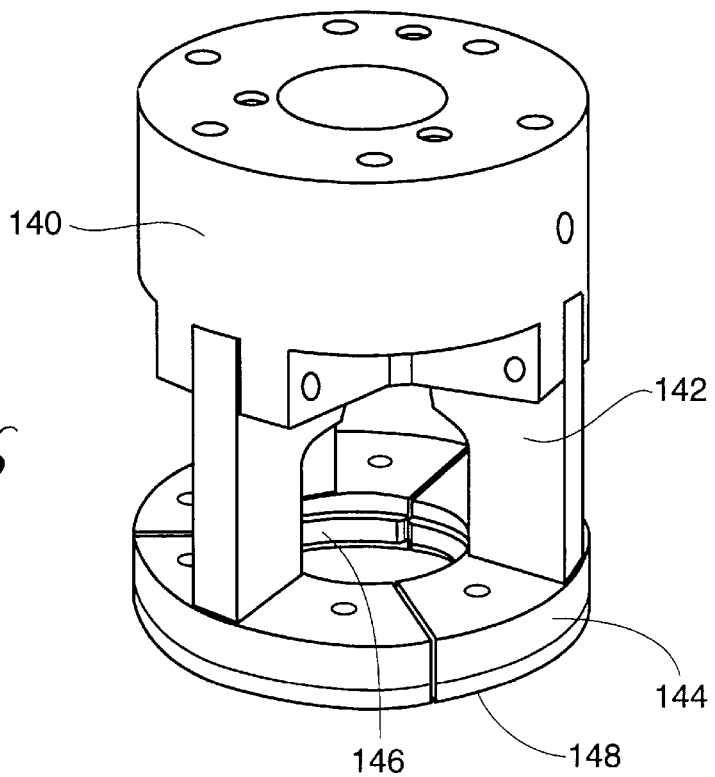
FIG. 5b is a perspective view of a gripper mechanism, showing the fingers in their closed position.

Now referring specifically to full bottle gripper plates 110, and as is shown in FIGS. 2 and 3, a multiple finger gripper mechanism 140 is attached to each gripper plate 110. In our preferred embodiment, the gripper mechanisms 140 include three jaw gripper bodies with conventional pneumatic pistons (not shown). While not shown in the drawings, the pneumatic pistons are located within the housing of each gripper mechanism 140. The gripper mechanisms operate on clean dry plant air systems. One such device is manufactured by Compact Air of Westminster, S.C. The preferred model is number ARG403. Referring to FIG. 5a, each gripper mechanism 140 further includes three bottle fingers 142, three finger bottoms 144, three finger pads 146 and three finger clamp plates 148. The fingers 142 extend from the gripper mechanisms 140 and terminate at the finger bottoms 144. The finger pad 146 is held in place between each finger bottom 144 and finger clamp plate 148. The finger pads 146 are preferably fabricated from a urethane material having a durometer of 80A.

Figure 6A:
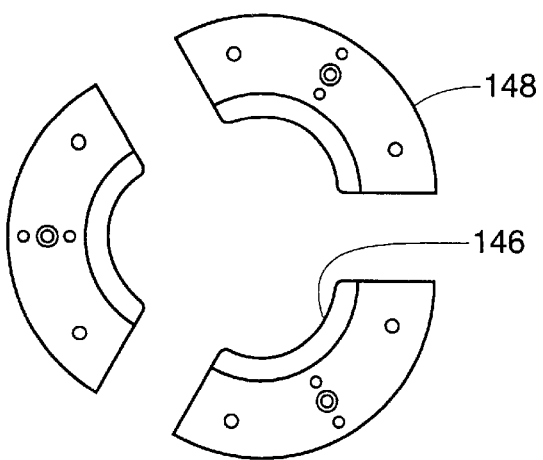
FIG. 6a is an end view of the gripper mechanism fingers in their open position.
Figure 6B:
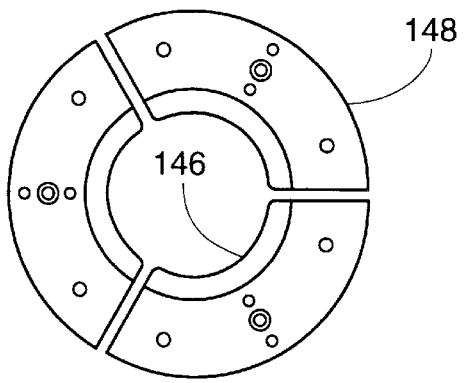
FIG. 6b is an end view of the gripper mechanism fingers in their clamped position.
Figure 6C:
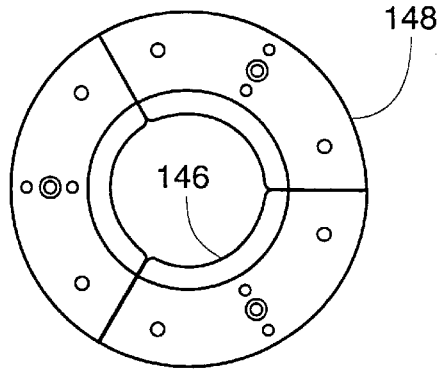
FIG. 6c is an end view of the gripper mechanism fingers in their closed position.

The gripper fingers 142 act in unison and have three finger positions. The positions include full open (FIG. 6a), clamped (FIG. 6b), and closed (FIG. 6c). Only finger pads 146 contact the neck 24 of each bottle 20 thereby preventing damage to the bottleneck 24 and the bottle cap 28. While a three finger arrangement has been disclosed as the preferred embodiment, it is to be understood that a fewer or greater number of fingers could be used without departing from the invention.

A gripper mechanism 140 may be attached to each gripper plate 100 or 110. The gripper mechanisms for full bottles are similar to the gripper mechanisms for empty bottles in most aspects. The key differences include the provision of structurally enhanced fingers 142 attached to the gripper mechanisms 140 that grip full bottles. This is preferred due to the weight difference between an empty water bottle 20 and a full water bottle 20. In addition, a pair of bottle support pins 130 and bottle support pin brackets 120 are attached to each full bottle gripper plate 110. As shown in FIG. 4, the brackets 120 are affixed, with fasteners, to full bottle gripper plates 110. A bottle support pin 130 is inserted into the opening formed on the opposite side of each bracket 120. The pins 130 support the full water bottles 20 as they are moved from a substantially vertical position to substantially horizontal position as will be described in detail below. While the use of brackets 120 attached to gripper plates 110 is the preferred method of attaching the bottle support pins 130 to the end-effector 10, it will be appreciated that other configurations could be utilized without departing from the invention to achieve the same result.

The opening and closing of gripper mechanism fingers 142 are controlled by the robot control system 16. When the robot arm 14 has properly positioned the end-effector 10, a pneumatic solenoid valve (not shown) is actuated, closing the gripper fingers 142. Sensors (not shown) on the gripper mechanisms 140 indicate the open or closed state of the fingers 142.

Referring to FIG. 1 and FIGS. 7 through 10, the present invention 10 is utilized in the following manner. Empty rack assemblies 52 are loaded into the rack conveyor 50 by a loading mechanism such as a fork lift truck (not shown). The racks 52 are next positively located within the robotic cell for robotic loading.

Filled water bottles 20a are conveyed into the robotic cell on the infeed conveyor 30. The filled water bottles 20a are metered to a predetermined pickup location on the infeed conveyor 30. To avoid excessive backpressure, a stop mechanism (not shown) allows only a predetermined number of bottles 20a to enter the robotic cell. The bottles 20a may be separated to provide for bottle spacing that is coincident with the spacing of the rack partitions and the gripper mechanisms 140. A product locator may be advance, around and between each bottle 20a, creating the proper spacing to coincide with the rack 52 being loaded. The robotic gripper assembly 10 has also been previously adjusted to have the same spacing between the gripper mechanisms 140. When the filled and capped water bottles 20a have been metered into position, and properly located, a programmable logic controller (PLC) controlled to the conveyor system signals the robot control system 16 that the bottles 20 are ready for pickup.

Racks 52 of empty bottles 20b are conveyed into the robotic cell on the rack conveyor 50. A rack 52 is conveyed into the loading position, and positively positioned and held for robotic loading. When the rack 52 has been positioned, the PLC signals the robot control system 16 that a rack 52 is ready for unloading and loading. The robot 12 proceeds to unload empty bottles 20b from the rack 52, and simultaneously, load full bottles 20 into the rack 52.

The preferred end-effector apparatus 10 is designed to handle four full bottles 20a and/or four empty bottles 20b per robot cycle. The end-effector 10 includes eight gripper mechanisms 140 and eight bottle support pins 130. As previously described, a pair of bottle support pins 130 will support each filled bottle 20a gripped by each gripper 140 attached to the fixed support rail 80. Each gripper 140 will engage and grip around the bottleneck 26, and below the cap 28 of the bottle (if present).

Figure 7:
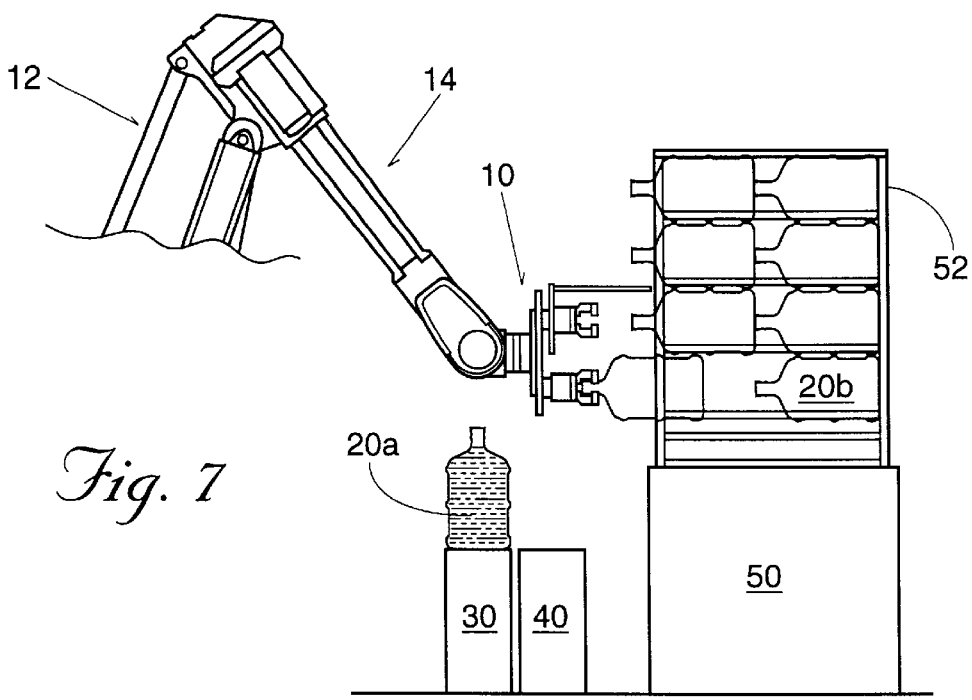
FIG. 7 is an environmental view of the system, showing the bottom row of empty water bottles being removed from the rack.
Figure 8:
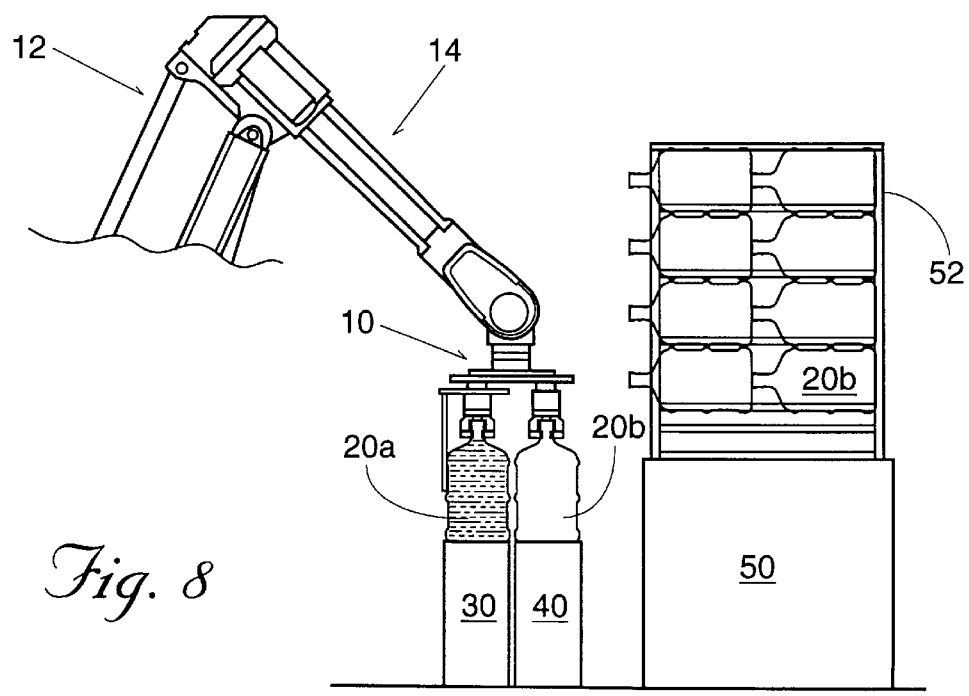
FIG. 8 is an environmental view of the system, showing the simultaneous release of empty bottles on the exit conveyor and gripping of full bottles on the infeed conveyor.

In the preferred embodiment and after the rack assembly 52 has been conveyed into the cell, the end-effector apparatus 10 rotates 180 degrees so that the adjustable rail 90, having the empty bottle gripper plates 100 and gripper mechanisms 140 attached thereto, is located along the bottom side of the end-effector apparatus 10. In this position, and as shown in FIG. 7, the bottle support pins 130 will be located along the top side of the end-effector 10. The end-effector 10 first grips and removes the bottom row of empty bottles 20b from the rack and transports the empty bottles 20b to the exit conveyor 40. If the rack is two bottles deep, the back row of bottles is biased forward by a known bottle pushing apparatus 54 (shown in phantom in FIG. 1) and this back row is also gripped. While being transported to the exit conveyor 40, the robot arm 12 again rotates one hundred eighty degrees so that, when the bottle support pins 130 are parallel to the ground, the bottle support pins 130 are now along the bottom side of the end-effector apparatus 10. The empty bottles 20b are further transported and released onto the exit conveyor 40. As shown in FIG. 8, while releasing the empty bottles 20b on the exit conveyor 40, the end-effector 10 simultaneously grips a row of full water bottles 20a from the infeed conveyor 30.

Figure 9:
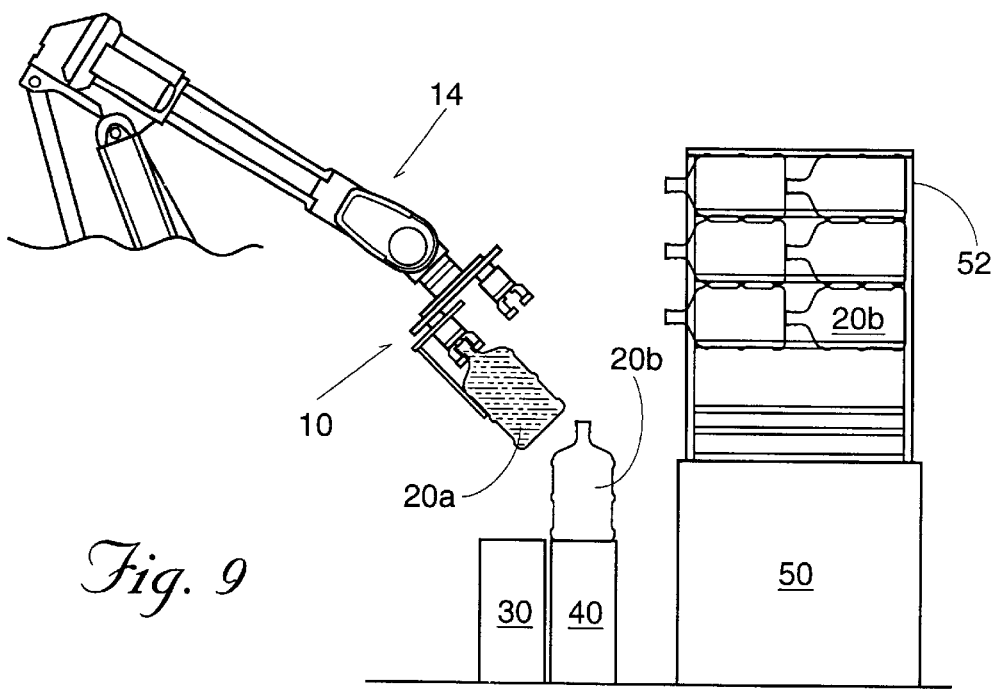
FIG. 9 is an environmental view of the system, showing the rotation of the fifth axis of the robot arm while gripping full water bottles.
Figure 10:
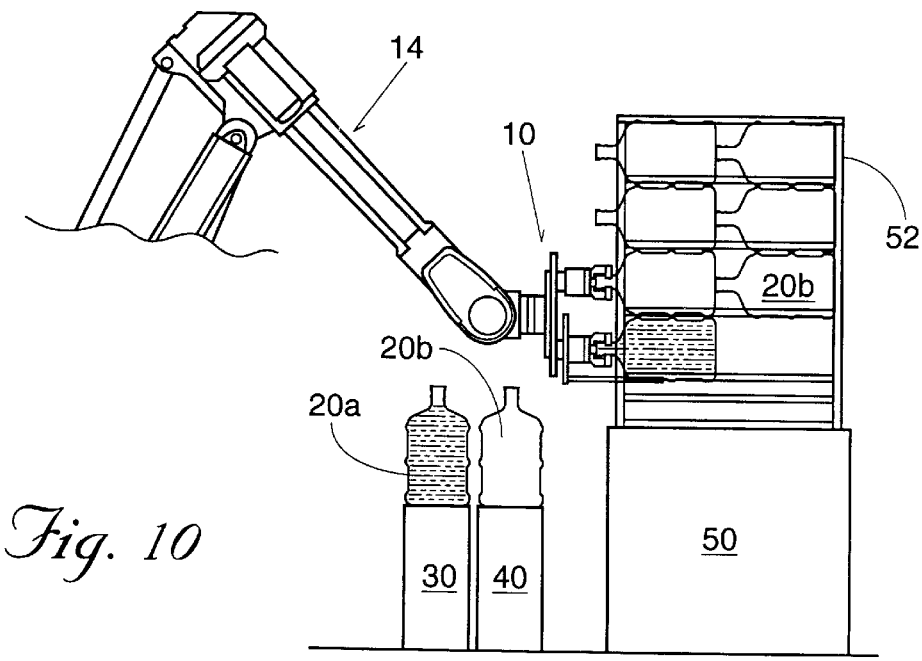
FIG. 10 is an environmental view of the system, showing the simultaneous release of full bottles in the rack and gripping of empty bottles in the rack.

Now referring to FIG. 9, as the robot 12 lifts the full bottles 20a from the conveyor 30, the robot wrist or fifth axis will tilt upward, rotating the bottom of the bottle upwards. The bottle support pins 130 carry the weight of each filled bottle 20a. The full bottles 20a are transported to the rack 52 and inserted into to the bottle locations where the empty bottles were previously removed. With reference to FIG. 10, as the full bottles 20a are released in the rack, the row of empty bottles 20b located just above the now being released full bottles 20a are gripped and transported to the exit conveyor 40. Again, if the bottle rack is of the two bottle deep design, the upper row of empty bottles 20b will be biased forward by the pushing device 54 and a second row of full bottles 20a will be inserted into the same rack openings thereby pushing the previously inserted bottles to the back of the rack.

Figure 11:
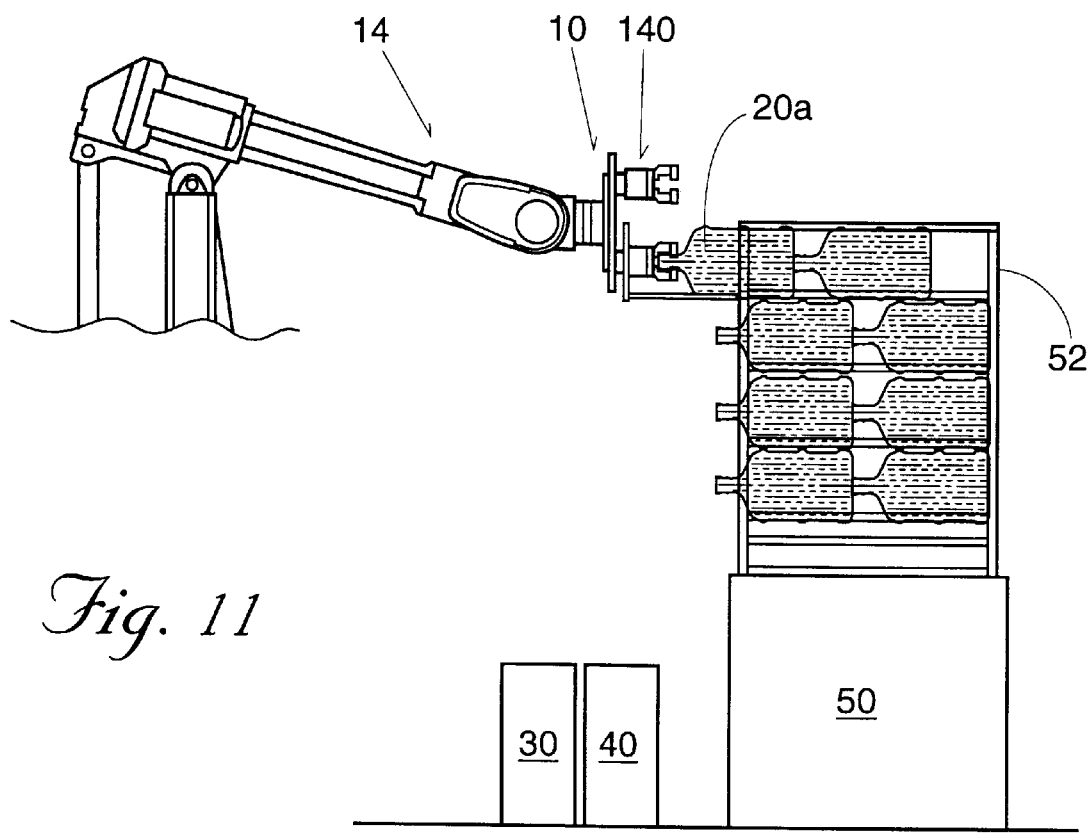
FIG. 11 is an environmental view of the system, showing the insertion of full bottles into the top row of the rack.

This process is continued until the last set of empty bottles 20b is transported to the exit conveyor 40. The end-effector apparatus 10 then grips a row of full water bottles 20a from the conveyor 30 and loads them into the rack 52. As shown in FIG. 11, during this cycle no empty bottles are removed.

Finally, the rack 52 is released from the rack conveyor 50, conveyed out of the cell and a new rack 52 full of empty bottles 20b is conveyed into the cell. Once the new rack 52 is properly located and locked into position, the robotic cycle is repeated.

While a method of unloading empty bottles 20b from and loading full bottles 20a into rack assemblies 52 by rows has been described, it is to be understood that the same method and apparatus could be employed to unload and load bottles by columns. For example, in a three bottle by five bottle rack assembly 52 configuration, fewer robotic movements would be required to unload and load bottles by column as compared with unloading and loading by row. With respect to the end-effector 10, the mounting position of each pin supporting bracket 120 (if present) and bottle support pin 130 would be relocated on the full bottle gripper plate 110. By moving one pin 130 to the opposite corner of the gripper plate 110, the new pin location would allow the pins 130 to similarly support each full bottle 20a when the end-effector 10 has been rotated approximately ninety degrees.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. An apparatus for gripping, transporting and loading a container having side walls and a neck, the apparatus comprising:

a pair of parallel rails spaced at a predetermined distance from one another;

a plurality of gripper mechanisms, each gripper mechanism being affixed to one of said parallel rails;

a plurality of support pins, each pin being attached to one of said rails; and each gripper mechanism having a plurality of fingers, and each said finger being capable of moving from an open position to a clamped position.

2. The apparatus of claim 1, further comprising:
    said pins projecting at a substantially normal angle from said rails.

3. The apparatus of claim 1, further comprising:
    a top plate, each said rail member being removably attached to said top plate.

4. The apparatus of claim 1, wherein said rails are laterally adjustable.

5. The apparatus of claim 1 further comprising a robot control system having an output, said output being electronically coupled to each said gripper mechanism.

6. The apparatus of claim 1, further comprising:
    at least one gripper plate, said gripper plate attached to one of said rails; and
    a gripper mechanism attached to said gripper plate.

7. The apparatus of claim 6, wherein said plurality of support pins are attached to said gripper plate.

8. The apparatus of claim 1 further comprising:
    each finger having a distal end and a clamp plate attached to each distal end; and
    a plurality of finger pads, each said finger pad being removably connected to one of each said finger clamp plates.

9. The apparatus of claim 8 wherein said finger pads are clamped between said finger clamp plates and a pad retainer.

10. A robotic end of an arm tool for an industrial robot, said robotic end-effector comprising:

a plate capable of being coupled to the robot;

a pair of rails mounted on said plate and arranged for laterally spaced relative movement;

a plurality of gripper mechanisms, each gripper mechanism being attached to one of said rails;

a plurality of support pins, each pin being attached to one of said rails; and each gripper mechanism having a plurality of fingers, said fingers capable of moving from an open position to a clamped position.

11. A robotic end of an arm tool for the transportation of a group of containers gripped by the fingers of claim 10, wherein said lateral spacing between said rails is adjustable.

12. A robotic end of arm tool for the transportation of a group of containers gripped by the fingers of claim 10, wherein said location of each said gripping mechanism is adjustable.

13. A system for gripping, transferring and loading containers from a pick-up position, said system comprising:

a supply of full containers at said pickup position;

a rack, said rack filled with empty containers;

an industrial robot with an end-effector, said end-effector having a pair of rails spaced a predetermined distance from one another, a plurality of gripper mechanisms, each gripper mechanism being affixed to one of said rails, a plurality of support pins, each pin being attached to one of said rails, each gripper mechanism having a plurality of fingers, each said finger being capable of moving from an open position to a clamped position; and an unloading station adjacent to said pick-up position whereby empty containers are gripped by said end-effector, removed from said rack and transferred to said unloading station where full containers are substantially simultaneously gripped by said end-effector and transferred to said rack.

14. A method for unloading a first set of containers from a rack and loading a second set of containers into said rack, the method comprising the steps of:

providing a robotic end of an arm tool having a pair of rails spaced at a predetermined distance from one another, a plurality of gripper mechanisms, each gripper mechanism being affixed to one of said rails, a plurality of support pins, each pin being affixed to one of said rails, each gripper mechanism having a plurality of fingers, said fingers being capable of moving from an open position to a clamped position;

removing a first container from said first set of containers from said rack;

transferring said first container to a drop-off station;

substantially simultaneously releasing said first container at said drop off station while gripping a second container from said second set of containers at an adjacent pick-up station; and transporting said second container to said rack.

15. The method of claim 14 further comprising the step of:
    releasing said container from said second set of containers in said rack while simultaneously gripping another container from said first set of containers.

* * * * *